July 19, 1966 R. P. FRITSCH 3,261,056
DEVICE FOR WORKING UP THERMOPLASTIC SYNTHETIC MATERIAL
Filed Feb. 16, 1965
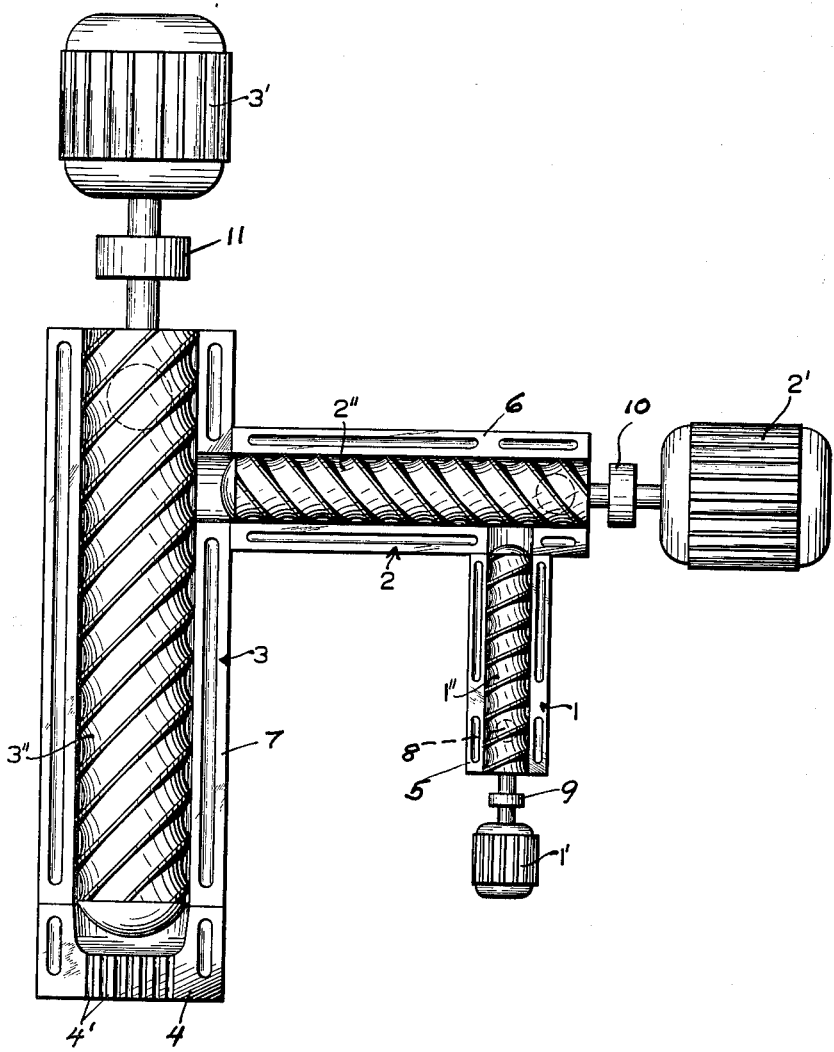
INVENTOR
RUDOLF PAUL FRITSCH
BY Hauer and Hydial
ATTORNEYS 3,261,056
DEVICE FOR WORKING UP THERMOPLASTIC
SYNTHETIC MATERIAL
Rudolf Paul Fritsch, Stuttgart-Weilimdorf, Germany,
assignor to Werner & Pfleiderer, Stuttgart-Feuerbach,
Germany, a firm of Germany
Filed Feb. 16, 1965, Ser. No. 433,037
Claims priority, application Germany, Feb. 29, 1964,
W 36,290
2 Claims. (Cl. 18—12)

The present invention relates to devices for working up thermoplastic synthetic material by pre-compressing or densifying, plasticizing, extruding, and, if desired, granulating the material, and more particularly, the invention relates to devices in which the thermoplastic synthetic material is worked up by the action of rotary worm type extruders.

There are known extruders of the afore-referred to general kind in which the densifying, plasticizing and extruding of the thermoplastic synthetic material, for instance, polyvinyl chloride, is effected by means of a single rotary worm, that is, by means of a worm which must include a feed section, a pre-compressing or densifying section, plasticizing section and an extruding section. One of the most important disadvantages of such single worm extruders is that the output of the extruders is determined by the output capacity of the extrusion section of the single worm in the extruder. Any attempt to increase the output of the extruder entails a corresponding increase in the quantity of the material fed to the extruder and also a corresponding increase in the r.p.m. of the worm. As it is evident, an increase in the r.p.m. of the worm causes a corresponding increase in the pressures and the temperatures prevailing in the extrusion section of the device and as a result, an undesirable or dangerous overloading of the device and possibly a scorching of the synthetic material within the extrusion section.

It is a broad object of the invention to provide a novel and improved device for working up thermoplastic synthetic masses, which device permits a convenient variation of the output of the device without endangering either the device or the material to be worked up.

The aforementioned object, feature and advantage of the invention, and other objects, features and advantages which will be pointed out hereinafter are attained by providing several rotary worm extruders disposed in series arrangement and in communication with each other for feeding the material to be worked up sequentially through the extruders. A rotary drive means is provided for each of the extruders to drive the same independently. The sequentially first one of the extruders constitutes a feed and pre-compression or densifying means and has a comparatively narrow diameter; it is driven at a comparatively high rate of r.p.m. by the respective drive means. The sequentially second one of the extruders constitutes a plasticizing means and has a wider diameter than the first one and is driven at a lower rate of r.p.m. than the first extruder. The sequentially third extruder constitutes a discharge means and has a still larger diameter and is driven at a still lower rate of r.p.m. Of course, each one of the three extruders may be further subdivided.

In the single figure of the accompanying drawing, a preferred embodiment of the invention is shown by way of illustration and not by way of limitation.

The figure shows diagrammatically a sectional view of the device according to the invention.

Referring now to the figure in detail, the device as exemplified comprises three coacting extruding means, to wit, an extruding means 1 comprising a barrel 5 in which a worm 1″ is rotatably supported; an extruding means 2 comprising a barrel 6 in which a worm 2″ is rotatably supported; and an extruding means 3 comprising a barrel 7 in which a worm 3″ is rotatably supported. As is shown in the figure, the three extruding means are disposed in series and in communication with each other so that the thermoplastic synthetic material to be worked up, such as polyvinyl chloride, when fed to extruding means 1 form a suitable source of supply (not shown) by means of a feed port 8, is sequentially conveyed through the three extruders and finally discharged through an extrusion head 4 including perforations 4′. Obviously, any suitable type of extrusion head or die plate may be used.

Each of the three extruding means is driven by its own drive means. There is shown a motor 1′ for extruding means 1, a motor 2′ for extruding means 2 and a motor 3′ for extruding means 3. The three motors should be visualized as conventional variable speed motors, or as being coupled to the respective extruding means by a conventional variable speed transmission, such as is indicated at 9, 10 and 11, to permit an independent regulation of the rotary speeds of the worms in the three extruding means.

Worm 1″ is shown as having a comparatively small diameter and its motor 1′ should be visualized as being adjusted for high r.p.m. so that the extruding means 1 is capable of receiving a comparatively large quantity of the material to be worked up, or pre-compressing or densifying such large quantity and conveying the same to the worm 2″ of extruding means 2. The second worm 2″ which serves to plasticize the material, is shown as having a larger diameter than worm 1″ and the r.p.m. of motor 2′ are lower than those of motor 1′. The material plasticized in extruding means 2 is fed to worm 3″ in extruding means 3. This worm has a wider diameter than either worm 2″ or worm 1″ and is rotated by its motor 3′ at a lower r.p.m. than either one of the preceding worms. Worm 3″ extrudes the material through the aforedescribed extrusion head 4.

In the event it is desired to granulate the extruded material, suitable cutting means may be provided in a conventional manner on the outside of head 4.

As has been previously explained, the r.p.m. of the three extruding means in reference to each other may be conveniently and independently varied and as a result, the total output of the entire device can be increased by simply increasing the r.p.m. of worm 1″ by adjusting its drive motor 1′. Such increase in the total output of the device does not in any way endanger the device itself, or the material to be worked up therein, for instance, by scorching or otherwise overheating since the wide final worm 3″ can readily accommodate variations of the quantities of the material fed to worm 1 within a wide range. As pointed out before, extruders in which a single rotary worm is used to perform all the required operations, any appreciable increase in the speed of the worm to increase the output of the device entails a strongly increased friction within the device and such increase in friction tends to produce a dangerous and damaging increase in the temperature of the material to be worked up. Due to the wide diameter of worm 3 and the possibility of independently regulating the r.p.m. of worm 3″ and also of the other worms to any desired rate of rotation, any harmful increase in friction and a resulting increase in the temperature of the material can be effectively avoided.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:
1. A device for working up thermoplastic synthetic ma- terial by densifying, plasticizing and extruding, said device comprising several rotary worm extruding means disposed in series arrangement and in communication with each other for feeding the material to be worked up sequentially through said extruding means, and a rotary drive means for each of said extruding means for independently driving the same, the sequentially first one of said extruding means constituting a densifying means and having a comparatively narrow diameter and being driven at a comparatively high rate of r.p.m. by the respective drive means, the sequentially second one of said extruding means constituting a plasticizing means and having a wider diameter and being driven at a lower rate of r.p.m. and the sequentially third one of said extruding means constituting a discharge means and having a still larger diameter and being driven at a still lower rate of r.p.m.

2. A device according to claim 1, wherein each of said rotary drive means is a variable speed drive means.

References Cited by the Examiner
UNITED STATES PATENTS

| | | | |
|---|---|---|---|
| 1,666,067 | 4/1928 | Bailie et al. | |
| 2,836,851 | 6/1958 | Holt | 18—12 |
| 3,143,231 | 9/1964 | Spencer | 18—12 X |

WILLIAM J. STEPHENSON, *Primary Examiner.*